United States Patent [19]

von der Heide

[11] 4,344,022

[45] Aug. 10, 1982

[54] LINEAR MOTOR

[75] Inventor: Johann von der Heide, Mönchsweiler, Fed. Rep. of Germany

[73] Assignee: Papst Motoren KG, St. Georgen, Fed. Rep. of Germany

[21] Appl. No.: 133,122

[22] Filed: Mar. 24, 1980

[30] Foreign Application Priority Data

Mar. 29, 1979 [DE]  Fed. Rep. of Germany ....... 2912531

[51] Int. Cl.³ ............................................. H02K 7/06
[52] U.S. Cl. ...................................... 318/38; 318/135; 310/12; 310/13
[58] Field of Search .................... 318/38, 135; 310/12, 310/13

[56] References Cited

U.S. PATENT DOCUMENTS

| | | | |
|---|---|---|---|
| 3,219,854 | 11/1965 | McLaughlin | 318/38 X |
| 3,243,238 | 3/1966 | Lyman | 318/38 X |
| 4,234,831 | 11/1980 | Kemmer et al. | 318/135 X |

*Primary Examiner*—B. Dobeck
*Attorney, Agent, or Firm*—Michael J. Striker

[57] ABSTRACT

A linear motor unit includes a stator having on outer flux-carrying structure and an inner flux-carrying structure, and an armature arranged for travel along the length of the inner flux-carrying structure. The inner flux-carrying structure comprises an elongated rod. The armature slidably positioned along these rods carries a number of coils spaced one from another in the direction of elongation of the rod and surrounding the rod. A plurality of sets of permanent magnets are concentrically positioned within the outer flux-carrying structure which is arranged in a form of two tubular elongated members. The permanent magnets in each set are radially positioned with respect to the rods and located one opposite to another. Preferably successive ones of the sets of magnets have an alternate polarity. The coils are energized periodically and in a cyclical sequence to provide a motive force for the movement of armature along the parallel rods.

12 Claims, 4 Drawing Figures

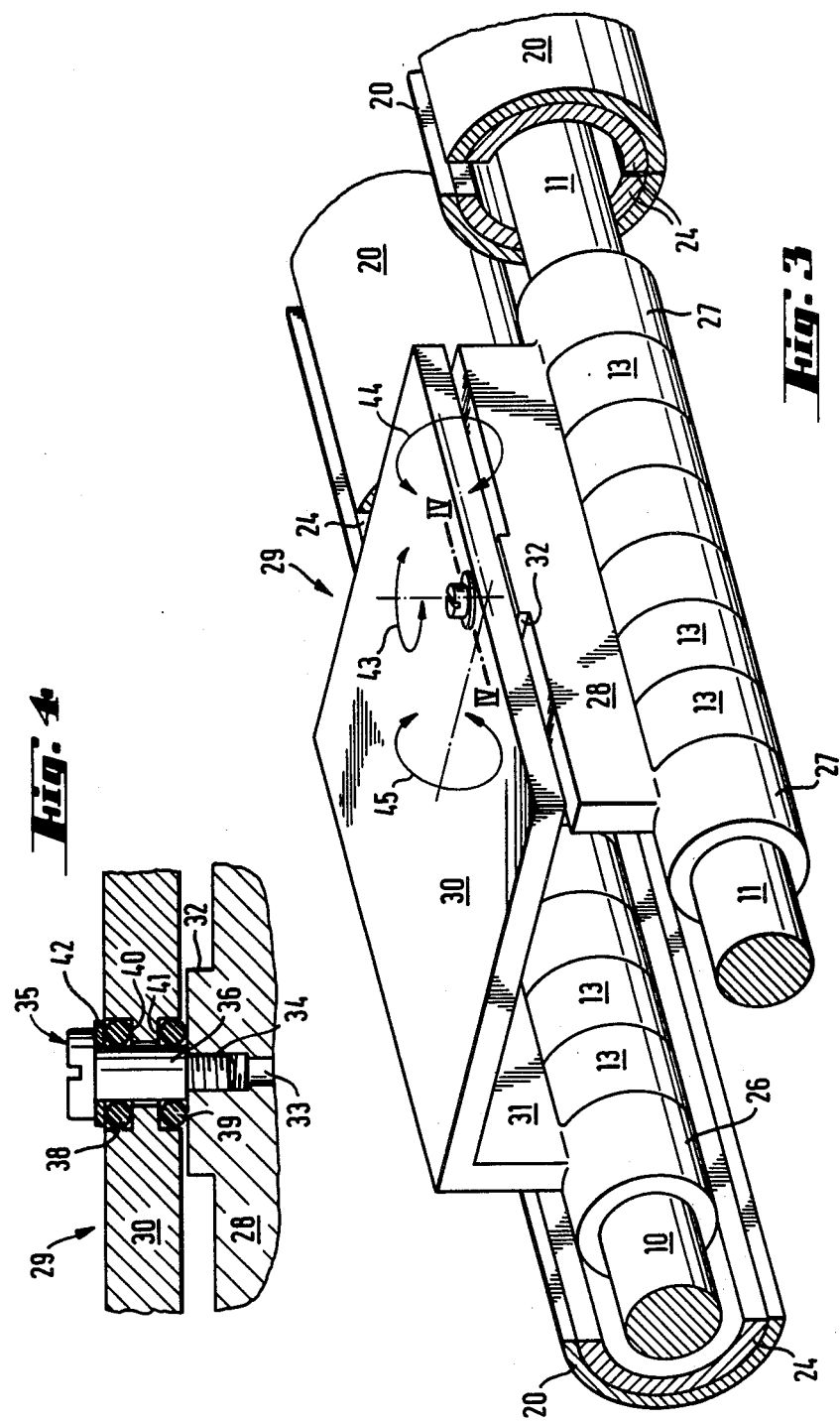

LINEAR MOTOR

BACKGROUND OF THE INVENTION

The present invention relates to linear motors of the type whose armature field is established by permanent magnets. More particularly, the invention relates to linear motors of the type including parallel ferro-magnetic bars connected to a magnetic system, with a coil arrangement mounted for movement along the length of the two bars, wherein the coil arrangement is energized by current and intersecting the magnetic field lines emanating from the bars.

The magnetization direction of the permanent magnets employed in such linear motors is perpendicular to the direction of armature travel and the magnetic polarity of successively positioned permanent magnets alternates.

Such linear motors may be employed as drive mechanisms for peripheral equipment in data processing applications.

The known linear motor is disclosed for example, in the U.S. Pat. No. 4,151,447. This motor comprises two parallel guide bars formed as a U-shaped profile with two elongated legs. At least two flat armature coils which are located one after the other in the direction of linear armature travel are provided. The broad faces of the coils are parallel to the general plane in which they move and their axles of windings are perpendicular to the direction of movement. In this construction a relatively great part of the energized coil participates electro-magnetically in the generation of motive force. However, with this construction the ends of the coils do not actually participate in the motive-force generation to advance the armature since they are located in the region where the coil conductors are moved in the direction of the movement of the coil arrangement. In this respect, it has to be considered that from the total length measured in the direction of movement of the coil arrangement that part which corresponds to the interior of the coils does not contribute anything to the motiveforce generation. To avoid this, an additional number of coils may be provided in the motor which may be placed within the interior of the coils, however this may complicate the armature-coils performance.

SUMMARY OF THE INVENTION

It is therefore an object of the present invention to increase the efficiency of linear motor by further increasing the fraction of coil constituent conductors actually participating in the generation of a motive force.

It is another object of the invention to improve the construction of the linear motor.

Still another object of the invention is to provide a linear motor construction which is easy to assemble.

These and other objects of the invention are attained by a novel design of the linear motor unit, which comprises a stator and an armature mounted for travel along the length of said stator. The stator includes an inner flux-carrying structure and an outer flux-carrying structure. The inner flux-carrying structure includes a pair of elongate spaced parallel rods. A plurality of sets of permanent magnets are concentrically positioned within the outer flux-carrying structure. The sets of magnets are juxtapositioned in the direction of elongation of the rods; and the magnets in each set are radially magnetized in the same direction, the magnetic polarity of successive ones of the sets of magnets alternating proceeding in the direction of armature travel from one set of magnets to the next. The armature which is slidably positioned on the rods carries a plurality of coils positioned side by side in the direction of elongation of the rods. The coils are concentrically positioned within said sets of permanent magnets. The coils are energized periodically and in a cyclical sequence to provide a motive force for the movement of the armature along the rods.

By utilizing the construction of the invention a substantially larger fraction of the coil conductors constituting the current flowing in the magnet system contributes to the generation of motive force. Practically the total length of the coil conductor participates in the motiveforce development. It is important that the entire length of the movable coil arrangement is covered with copper. This may be easily obtained in the type of construction of the invention. The concentrical position of the parts of the motor unit provides a substantially high mechanical stability. Manufacturing and assembling of the motor units of the invention is relatively simple.

The known linear motor construction is also disclosed in the Great Britain Pat. 1,326,174. In this arrangement a single elongated magnet is provided, which is associated with one single coil.

In such linear motors, having relatively long strokes, a high flux concentration may require a large cross-sectional area of the flux-return structure of the motor's magnetic circuit. The inductance of such arrangements is undesirably high. In such cases the compensative coils may be required to avoid the forementioned problem, which may lead to indesirably heavy constructions.

In contrast, in the present invention, the sets of permanent magnets are concentrically positioned within the outer portion of the stators and the magnets are radially magnetized. Such a concentrical location of the linear motor parts leads to a compact construction which achieves the same result without provision of additional coils. The coils in the motor of the invention may be spaced one from another by insulating rings mounted intermediate adjoining ones of the coils.

The rods of the inner flux-carrying structure may be made from steel or any other suitable material to provide a required outer rolling surface. The relatively large outer surface of the elongated rods of the inner flux-carrying structure provides for an effective cooling of the currentcarrying coils. The concentrical arrangement of the motor unit in accordance with the invention provides a gap between the motor parts which may be made within relatively small allowances. The arrangement may accomodate heat-dissipating means within this gap or within the rods for dissipating heat generated within the motor. The heat-dissipating means may be in a form of a cold-water cooling system or a forced-air cooling system or the like.

The inner flux-carrying structure may be arranged as a coil arrangement guide element, and in this case an additional guide device is not necessary.

The outer flux-carrying structure may be formed with two tubular members each having an elongated slit; these slits are directed to receive a bridge slidably positioned therein which serves to connect two coil supports mounted on the rods. The bridge may be coupled to a drive device of the motor for the advancing movement thereof.

In order to facilitate the assembly of the motor unit each tubular member of the flux-carrying structure is formed of two half-shells.

In the linear motor of the foregoing type the motive force is proportional to the length of the armature. Within the given dimensions of the motors the length of the armature is limited by the length of the motor stroke. In order to maximally increase the stroke two or more motor units with respective inner and outer flux-carrying structures and coil arrangements may be provided in the motor of the invention. In this case the total length of the coil arrangement and the stator arrangement may be shorter and still provide a relatively large stroke.

In the structure having two motor units the outer flux-carrying structures of two units may be interconnected.

The slits of two cylindrical members of the outer flux-carrying structure may be directed toward each other and coaxially aligned. The bridge is arranged to be slidably movable within a space provided between two elongated members of the outer flux-carrying structure.

Each individual coil is made from copper strip material and the individual coils may be electrically interconnected in three-strand configuration. Such arrangement provides in practice the least cost for the control electronics which are used to control coil energization. Also, this construction makes for very efficient utilization of the fields emanating from the permanent magnets.

Advantageously, means to absorb the kinetic energy of the armature are provided in the arrangement such as a shock-absorbing structure.

The inner flux-carrying device may be formed as a hollow member to accomodate heat-dissipating means such as cold water system, forced-air system or a heat pipe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a schematic perspective partial view of the linear motor of the invention comprising a modified connecting bridge; and FIG. 4 is a partial sectional longitudinal view taken along line IV—IV of FIG. 3.

DESCRIPTION OF THE PREFERRED EMBODIMENTS

Figure 1:
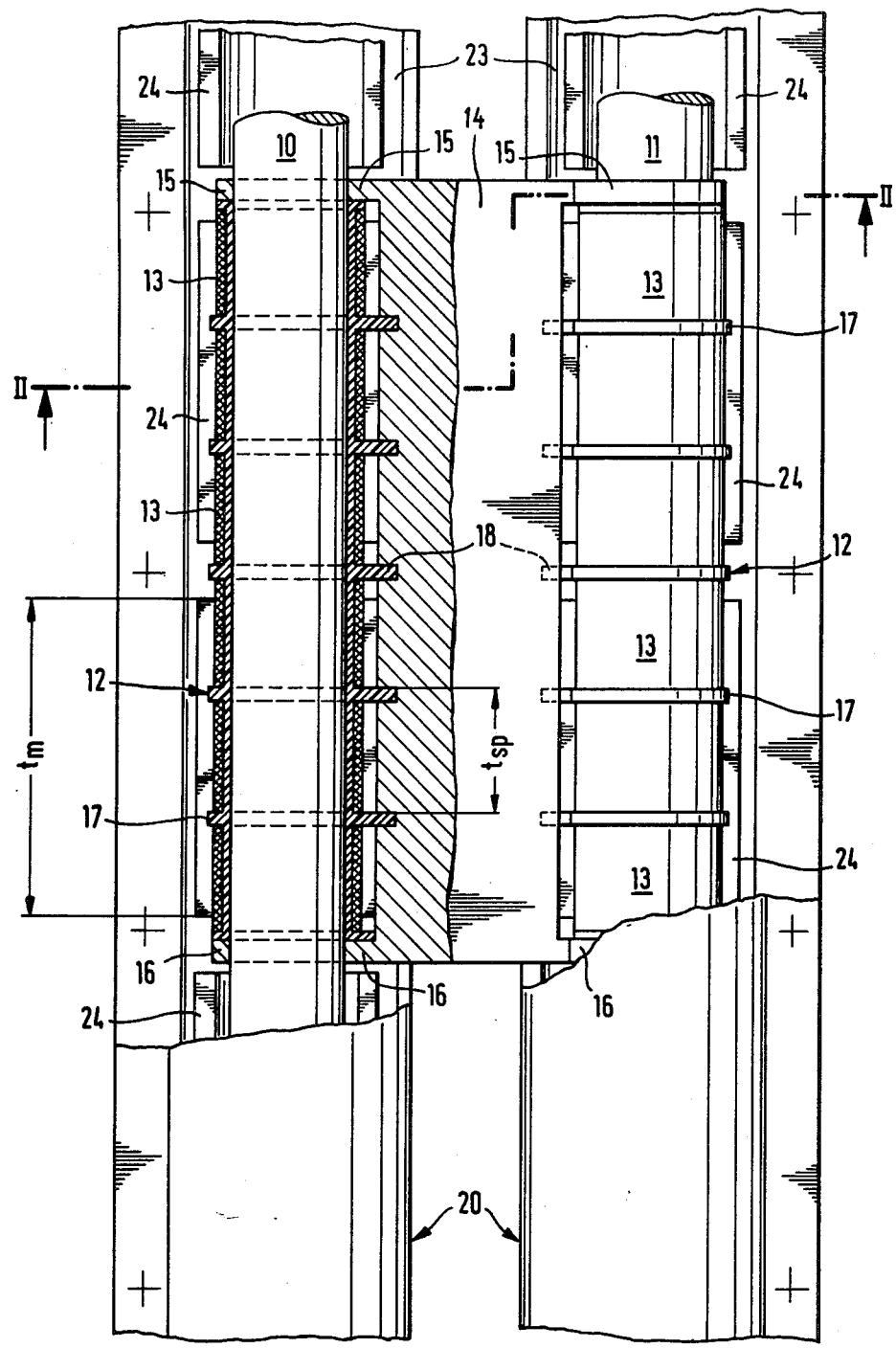
FIG. 1 is a partial sectional longitudinal view of the linear motor of the invention taken along line I—I of FIG. 2.

The linear motor of the invention includes an inner flux-carrying structure having a pair of rod-like ferromagnetic profiles 10 and 11. These rods may be made from a drawn or rolled steel with a requisite outer rolling surface. An annular coil support 12 is slidably positioned on each rod. Each annular coil support is a part of an armature of the magnetic arrangement of the motor and carries annular coils 13 axially extending along the elongation of the rods. Two coil supports 12 are surrounded with shanks 15 respectively, these shanks are interconnected by a bridge 14 and are slidably movable along the elongated rods 10 and 11. Flanges 17 are arranged between successive coils 13 which have outwardly extending portions 18 projecting into respective grooves formed in the bridge 14, shown by a dotted line in FIGS. 1 and 2. These portions serve as insulating rings disposed between the successive coils. Such sliding construction comprising coils 13, coil supports 12 and the bridge 14 may be connected to any conventional drive means one of which is disclosed in the above-mentioned U.S. Pat. No. 4,151,477.

Besides the rod-like profiles 10, 11, an outer flux ferromagnetic structure 20 also belongs to the stator of the ferro-magnetic arrangement of the invention. The outer structure 20 includes two elongated members each of which is formed as a tubular member comprising two interconnected half shells 22 and 23 which upon connection form a passage or slit 21 for receiving the bridge 14 therethrough. The adjacent sides of two half shells 22 and 23 of each tubular member 20 which are opposite to the passage 21 may be connected by any conventional means, for example, by welding. Each of the half-shells 22, 23 carries a number of segment-shaped permanent magnets 24 which are successively positioned within the interior of the tubular elements 20 and constitute the sets spaced in the direction of elongation of the rods 10 and 11. The sets of permanent magnets 24 surround the magnetic coils 13. The permanent magnets 24 in each set are radially magnetized in the same radial polarization direction, e.g. north pole at the radially outer side and south pole at the radially inner side, but the polarization directions of adjoining sets of magnets are opposite to each other.

The bridge 14 may be coupled with a carriage (not shown) of drive means to provide a slidable movement of the support elements 12 with shanks 15 of the armature along the length of the rods 10, 11.

For the operation of the rotor current is supplied to coils 13 by a commutating device (not shown) as a function of the relative position of the armature. The commutating device is disclosed in commonly owned U.S. Pat. No. 4,042,863, the entire disclosure of which is herewith incorporated by reference.

The commutating device has an opto-electronic positioning measuring device which determines the magnet position. In this commutating device a coded strip extends along the length of the travel path of a linear-motor armature, and optoelectric sensors on the armature sense coded markings on the strip, thereby generating control signals for commutating the coil-energization current. The further operation of the inventive linear motor unit is disclosed in the forementioned patent.

The illustrated motor may be used as the servomotor of a negative-feedback system. The coils in such arrangement may be connected to the power amplifier stage of the negative-feedback positioning system for use as a positioning servo motor or a stepper motor. Such arrangement is disclosed in the U.S. Pat. No. 4,042,863.

The linear motor unit may be modified within the limits of the inventive conception disclosed herein. Two or more motor units may be arranged which are interconnected to increase the stroke of the device. It is understood that the amount of phases in each coil is not limited by a number of three. The magnets may be mounted in the assembly by groups of three or even more to surround all the coils movably positioned along the elongated rods. If desirable, the coil body may be formed as one-piece element or multiple piece element which is radially located on the inner flux-carrying structure. Also, this construction makes for very efficient utilization of the fields emanating from the permanent magnets especially when ferrite and samarium-cobalt magnets are employed.

A cooling system may be employed in the arrangement to dissipate heat formed during the operation.

In the modified embodiment of FIG. 3 the annular coils 13 are schematically illustrated to be positioned between bearing members 26, 17 which are arranged for movement in axial direction on the elongated rods 10 and 11, respectively. A bridge 29, which is essentially inverted U-shaped, has one leg 28 thereof fixedly connected to the bearing members 27 on rod 11. The remaining part of bridge 29 comprised of a web member 30 and a second leg 31 is fixed to the bearings 26 sliding on rod 10. Leg 28 is provided in the central section thereof with an upwardly extending projection 32 having a threaded bore 33 which is substantially perpendicular to the longitudinal axis of rod 11. A threaded section 34 of a screw 35 extends into bore 33. Screw 35 includes a flange 36 having a larger diameter. Flange 36 abuts the top surface of projection 32 and extends with clearence through a bore 37 of web member 30. Two O-ring members 38, 39 encircle flange 36 and engage enlarged recesses 40, 41 at the top surface and the bootom surface, respectively, of web member 30. Recesses 40, 41 are concentric to bore 37. A washer 42 is provided between the upper side of O-ring member 38 and the head of screw 35. The O-ring members 38, 39 tend to center flange 36 relative to bore 37. The length of flange 36, the height of recesses 40, 41 and the cross-sections of O-ring members 38, 39 are dimensioned so that with flange 36 abutting projection 32, the O-ring members 38, 39 are slightly compressed and the bottom surface of web member 30 is maintained in a short distance from the top surface of projection 32.

In this manner an articulated joint coupling having three rotational degrees of freedom as indicated by arrows 43, 44 and 45 is provided between the armatures which are slidable on bars 10 and 11. This kind of interconnection of the armatures insures unimpeded movement of the armatures on rods 10, 11 even if misalignments occur during assembly between the rods 10, 11 and/or between the legs 28, 31 and the associated bearing members 27 and 26, respectively.

The permanent magnets 24 and the outer flux-carrying structure 20 are only schematically indicated in FIG. 3. It is obvious that they may be designed in a manner basically similar to that shown in FIGS. 1 and 2 with the exception that the longitudinal slits for the passage of legs 28, 31 are upwardly directed.

Figure 2:
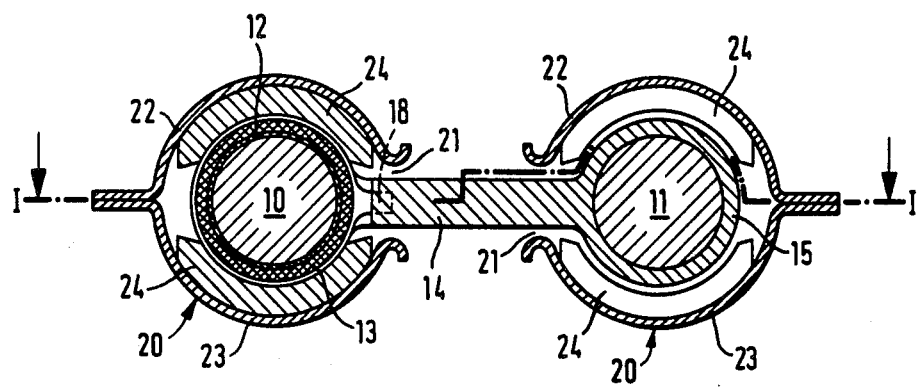
FIG. 2 is a transverse sectional view taken along line II—II of FIG. 1.

In a three-phase system the magnet pitch $t_m$, i.e. the axial distance between the beginning of a zone of one polarization and the beginning of an adjacent zone of opposite polarization, as indicated in FIG. 1, is three times the coil pitch $t_{sp}$, i.e. the axial length of each of coils 13. The physical axial length of the permanent magnets may be equal to the magnet pitch $t_m$. In such a case the magnets are arranged in axial direction with their end faces contacting each other. FIG. 1 however illustrates an embodiment in which the axial length of permanent magnets 24 is slightly smaller than the magnet pitch $t_m$ and magnets 24 are correspondingly spaced from each other. It is likewise possible to arrange magnets, the axial length of which is smaller or larger than the magnet pitch $t_m$, in endwise abutting relationship and to radially magnetize such magnets in conformity with the desired magnet pitch.

It will be understood that each of the elements described above, or two or more together, may also find a useful application in other types of linear motor units differing from the types described above.

While the invention has been illustrated and described as embodied in a linear motor unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A linear motor unit comprising a stator, an armature mounted for travel along the length of said stator, said stator including an inner flux-carrying structure and an outer flux-carrying structure, said inner flux-carrying structure having an elongated rod; a plurality of pole areas (pitches/domains) constituted by sets of permanent magnets concentrically positioned within said outer flux-carrying structure and juxtapositioned in the direction of elongation of said rod, said permanent magnets of said sets within one pole area being radially magnetized in the same direction, the magnetic polarity of said successive pole areas alternating proceeding in the direction of armature travel from one of said pole areas to the next; and said armature being slidably positioned on said rod and carrying a plurality of coils spaced one from another in said direction of elongation and concentrically positioned within said sets of permanent magnets, said coils being energized periodically and in a cyclical sequence to provide a motive force for the movement of said armature along said rods.

2. The linear motor of claim 1, wherein each of said sets of permanent magnets comprises a pair of cylindrical magnet half-shells.

3. The linear motor of claim 2, further including annular insulating rings mounted intermediate adjoining ones of the coils.

4. The linear motor of claim 3, wherein said armature includes two coil supports connected by a bridge.

5. The linear motor of claim 4, wherein said outer flux-carrying structure includes two elongated members of substantially cylindrical shape, each of said members being formed of two half-shells and having a slit, said slits of said two members being directed for constituting a passage to receive said bridge.

6. The linear motor of claim 1, further comprising at least one additional motor unit, said additional motor unit being connected to said linear motor unit.

7. The linear motor of claim 5, wherein said slits are coaxially aligned.

8. The linear motor of claim 7, wherein said bridge is slidably movable within a space provided between said two slits of said members of said outer flux-carrying structure.

9. A linear motor comprising at least two motor units, each of said motors units including an elongated stator, an armature mounted for travel along the length of said stator, and an articulated joint coupling for interconnecting the armatures of said motor units, said articulated joint coupling having at least one rotational degree of freedom, said stators each including inner and outer flux-carrying structures and a plurality of sets of permanent magnets concentrically positioned within said outer flux-carrying structure, said armatures being concentrically positioned within said sets of permanent magnets, said outer flux-carrying structure and the sets of permanent magnets of each motor unit defining a longitudinal slit, said articulated joint coupling being formed by a bridge comprising a web member and at least two legs, each one of said legs being fixed to the armatures of each of said motor units and extending through each one of said longitudinal slits, at least one of said legs being attached to said web member for limited relative movement thereto.

10. A linear motor comprising at least two juxtapositioned motor units extending in laterally spaced, substantially parallel relationship, each of said motor units including a stationary elongated stator and an armature mounted for travel along the length of said stator; and an articulated joint coupling extending between and interconnecting the armatures of said motor units for providing joint movement of said armatures, said articulated joint coupling having at least one rotational degree of freedom.

11. The linear motor of claim 10, wherein said articulated joint coupling has three rotational degrees of freedom.

12. The linear motor of claim 9, wherein said at least one leg is provided in the central section thereof with a projection extending towards said web member, said projection carrying a pin which projects with clearance into an opening of said web member, and wherein at least one resilient member encircles said pin, said resilient member tending to center said pin relative to said opening and to space said web member from said projection.

* * * * *